United States Patent
Haruno et al.

(10) Patent No.: US 9,143,021 B2
(45) Date of Patent: Sep. 22, 2015

(54) DYNAMO-ELECTRIC MACHINE

(75) Inventors: Kentaro Haruno, Toyota (JP); Yuki Yamakawa, Toyoake (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 13 days.

(21) Appl. No.: 14/239,843

(22) PCT Filed: Sep. 14, 2011

(86) PCT No.: PCT/JP2011/071030
§ 371 (c)(1),
(2), (4) Date: Feb. 20, 2014

(87) PCT Pub. No.: WO2013/038528
PCT Pub. Date: Mar. 21, 2013

(65) Prior Publication Data
US 2014/0217858 A1  Aug. 7, 2014

(51) Int. Cl.
*H02K 11/00* (2006.01)
*H02K 5/22* (2006.01)

(52) U.S. Cl.
CPC ............ *H02K 11/0047* (2013.01); *H02K 5/225* (2013.01); *H02K 2203/06* (2013.01)

(58) Field of Classification Search
CPC ......... H02K 3/50; H02K 5/225; H02K 11/00; H02K 11/001; H02K 11/0047; H02K 2203/06

USPC .................................................. 310/68 C, 71
See application file for complete search history.

(56) References Cited

U.S. PATENT DOCUMENTS

2009/0232185 A1 * 9/2009 Sasaki et al. .................. 374/208
2011/0285220 A1   11/2011 Sonohara et al.

FOREIGN PATENT DOCUMENTS

| JP | 59-97580 | 7/1984 | | |
|---|---|---|---|---|
| JP | 11-234964 | 8/1999 | | |
| JP | 2001-128414 | 5/2001 | | |
| JP | 2007-244025 | * 9/2007 | ............... | H02K 5/22 |
| JP | 2008-131775 | * 6/2008 | ............. | H02K 11/00 |
| JP | 2010-141968 | 6/2010 | | |
| JP | 2011-45177 | 3/2011 | | |

* cited by examiner

Primary Examiner — Burton Mullins
(74) Attorney, Agent, or Firm — Finnegan, Henderson, Farabow, Garrett & Dunner, LLP

(57) ABSTRACT

A structure which enables highly accurate detection of the temperature of the stator windings of a dynamo-electric machine. A terminal base (12) integrated with a stator by resin molding is provided with: positioning sections (13, 14, 15) for three-phase stator windings (100, 101, 102); and a positioning section (16) for a thermistor (17). The positioning section (16) is disposed between the positioning sections (14, 15). The thermistor (17) is insert molded on the terminal base (12).

3 Claims, 3 Drawing Sheets (A)

(B)

DYNAMO-ELECTRIC MACHINE

TECHNICAL FIELD

The present invention relates to an electric rotating machine, and more particularly to a structure of a stator (stationary element) in an electric rotating machine.

BACKGROUND ART

An electric rotating machine that may be used as an electric motor or generator is constituted with a stator and a rotor rotatably disposed on the inside of the stator. When electric current is made to flow through stator windings provided on the stator, heat is generated, which may result in increasing the temperature of the stator and possibly damaging stator parts. For this reason, it is necessary to detect the temperature of the stator at high accuracy. Therefore, techniques of providing a temperature detecting element on the stator and detecting the stator temperature have been conventionally known.

For the purpose of providing a stator of an electric rotating machine in which a temperature of stator windings is detected with quick response and high accuracy, below-listed Patent Document 1 discloses providing a metallic heat transfer part at a neutral point terminal electrically connecting the neutral points of the respective phases of the stator windings, the heat transfer part covering a temperature detecting element.

A configuration according to this conventional art is shown in FIG. 7 at (A) and (B). A terminal base is formed of an insulating resin material, and is disposed on segment conductors 22 at one axial end portion side of the stator. The terminal base is insert molded and integrated with three-phase input terminals and neutral point terminals 50, 54. The neutral point terminal 50 is formed extending along the circumferential direction of the stator core, and includes, at its two end portions in the lengthwise direction, stubs 51 protruding from the terminal base. Between the stubs 51 of the neutral point terminal 50, a cylindrical heat transfer part 52 is provided protruding in the same direction as the stubs 51, while being formed horizontally so that the axis of the cylindrical shape is aligned along the lengthwise direction of the neutral point terminal 50. The first stub 51 of the neutral point terminal 50 is electrically connected, at a neutral point connection part 56, to a lead wire 26 of a winding for one phase among the three-phase stator windings 20. Meanwhile, the other stub 51 of the neutral point terminal 50 and the first stub 55 of the neutral point terminal 54 are electrically connected, at a neutral point connection part 57, to a lead wire 27 of a winding for another phase among the three-phase stator windings 20. Further, the other stub 55 of the neutral point terminal 54 is electrically connected to a lead wire of a winding for the remaining one phase among the three-phase stator windings 20. The neutral point terminals 50 and 54 are electrically connected to each other via a lead wire.

A thermistor 60 serving as a temperature detecting element is inserted into the heat transfer part 52 of the neutral point terminal 50, and is also fitted into a groove 32 in the terminal base. The sensor part 62 of the thermistor 60 is mounted at a position covered by the heat transfer part 52. Further, the thermistor 60 is disposed so that its portion on one side in the lengthwise direction is inserted into the heat transfer part 52, while its portion on the other side in the lengthwise direction is held down by a hook 34 extending from the terminal base and formed in a shape of a claw to cover over the groove 32. In the heat transfer part 52, a slit 53 extending along the lengthwise direction is formed on the side where the stubs 51 are located, which is the inner side in the radial direction of the stator core. The thermistor 60, which is inserted into the heat transfer part 52 and fitted into the groove 32, is covered with an insulating resin material 36 obtained by melting an insulating powder

PRIOR ART LITERATURE

Patent Documents

Patent Document 1: JP 2008-131775 A

SUMMARY OF THE INVENTION

Problems to be Solved by the Invention

When mounting a temperature detecting element such as a thermistor on a stator, the temperature detecting element may be positioned on a resin molded member of the stator. However, in that case, a clearance (gap) may be generated between the temperature detecting element and the resin molded member, and variances in this clearance can disadvantageously cause degradation in temperature measurement accuracy. Furthermore, depending on the location at which the temperature detecting element is positioned, the temperature detecting element may undesirably receive influences from a cooling oil for cooling the stator windings.

According to the above-described conventional art, since the thermistor is inserted into the heat transfer part 52 and fitted in the groove 32, its position is fixed, so that degradation in temperature measurement accuracy due to variances in the clearance is avoided. However, as the thermistor is fixed to the neutral point terminal, the thermistor may not always accurately reflect the temperature of the three-phase stator windings. More specifically, while the neutral points of the three-phase stator windings are electrically connected to the neutral point terminal, and while it is expected that the temperature of the neutral point terminal will change as a result of tracking the temperature changes of the three-phase stator windings, the thermistor does not directly detect the temperature of the three-phase stator windings, and temperature change delays due to the tracking may be present.

An object of the present invention is to provide a structure in which the temperature of the stator windings can be detected with high accuracy.

Means for Solving the Problems

An electric rotating machine according to the present invention comprises a stator, a terminal base on which a stator winding provided on the stator is positioned, and a temperature detecting element that is positioned on the terminal base and that detects a temperature of the stator winding. The stator, the terminal base, and the temperature detecting element are integrally fixed to each other with resin.

According to one embodiment of the present invention, the stator winding comprises three-phase stator windings, and the terminal base includes first, second, and third, positioning parts at which the three-phase stator windings are positioned, respectively, and a fourth positioning part at which the temperature detecting element is positioned. The fourth positioning part is formed between two positioning parts located at two ends among the first, second, and third positioning parts.

According to another embodiment of the present invention, the first, second, third, and fourth positioning parts are formed in a straight line.

According to another embodiment of the present invention, the temperature detecting element is positioned diagonally with respect to an upper planar surface of the terminal base.

Advantages of the Invention

According to the present invention, since the stator, the terminal base, and the temperature detecting element are integrally fixed to each other with resin, positional deviation of the temperature detecting element is prevented, and the temperature of the stator windings can be detected with high accuracy. Further, since the fourth positioning part at which the temperature detecting element is positioned is formed between two positioning parts located at two ends among the first, second, and third positioning parts, the temperature of the three-phase stator windings can be detected with high accuracy without increasing the size of the terminal base.

EMBODIMENTS OF THE INVENTION

An embodiment of the present invention is described below with reference to the drawings.

Figure 1:
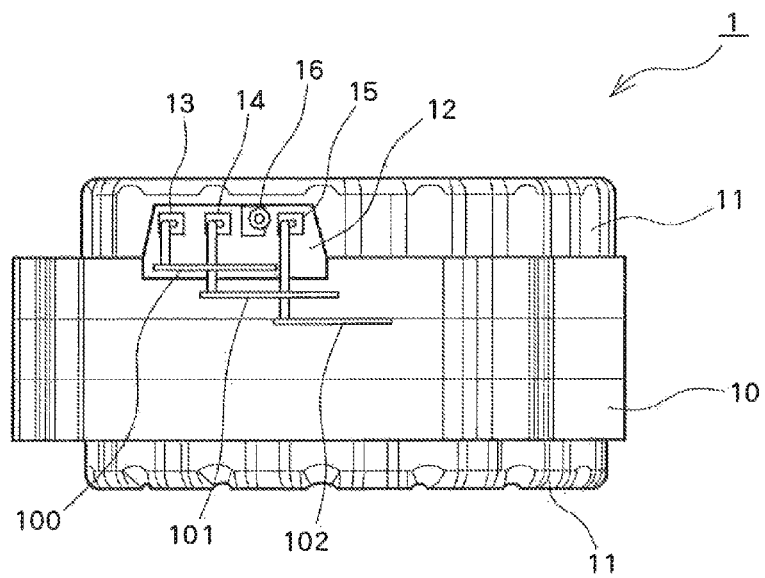
FIG. 1 is a plan view of an electric rotating machine.

FIG. 1 shows a plan view of an electric rotating machine according to the present embodiment. The electric rotating machine 1 is constituted with a stator and a rotor. A stator core 10 of the stator is formed in an annular shape by stacking, along the axial direction, magnetic steel plates having a predetermined thickness. A plurality of slots each extending in the axial direction are formed on the inner periphery of the stator core 10 while being arranged along the circumferential direction stator windings, which are three-phase windings, are mounted on the slots. An insulating member is interposed between the stator core 10 and the stator windings, and the stator core 10 and the stator windings are integrated into a single unit by means of a resin molded member 11.

Further, a terminal base 12 is formed at one end side of the stator core 10. The terminal base 12 is molded with resin and integrated with the resin molded member 11 of the stator. On the terminal base 12, there are formed positioning parts 13, 14, 15 for the respective three-phase windings. The positioning parts 13, 14, 15 function as input terminals for the respective three-phase windings. For example, the positioning part 13 is a positioning part or input terminal for the first phase (U-phase), the positioning part 14 is a positioning part or input terminal for the second phase (V-phase), and the positioning part 15 is a positioning part or input terminal for the third phase (W-phase). The positioning parts 13, 14, 15 for the respective three-phase windings are arranged and formed in a straight line with each other.

On the terminal base 12, separately from the positioning parts 13, 14, 15 for the three-phase windings, there is also formed a positioning part 16 for a thermistor serving as a temperature detecting element. In the drawing, the thermistor-positioning part 16 is arranged in a straight line together with the positioning parts 13, 14, 15, and is formed between the positioning part 14 and the positioning part 15. A thermistor is positioned at this positioning part and is insert molded with resin on the terminal base 12. As the thermistor is insert molded with resin on the terminal base 12 and the terminal base 12 is integrally fixed to the stator by means of the resin molded member 11, the thermistor, the terminal base 12, and the stator are integrated with each other into a single unit.

Figure 2:
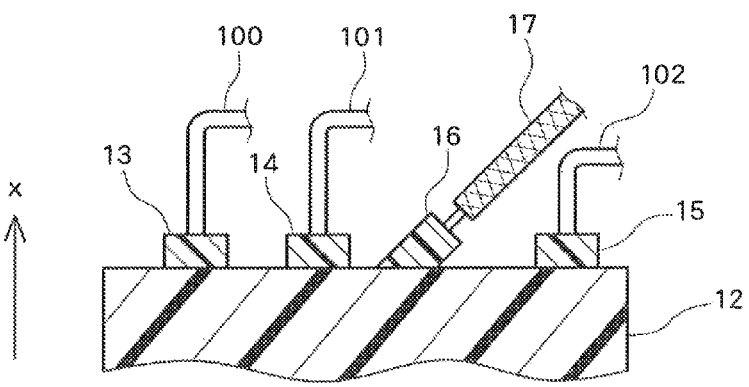
FIG. 2 is a partial cross-sectional view of a terminal base.

FIG. 2 shows a partial cross-sectional view of the terminal base 12. On the terminal base 12, the positioning parts 13, 14, 15 are formed in a straight line. The positioning parts 13, 14, 15 are each formed protruding from the upper planar surface of the terminal base 12. The positioning part 13 serves to position a first-phase winding 100 among the three-phase stator windings, for example. The positioning part 14 serves to position a second-phase winding 101 among the three-phase stator windings, for example. The positioning part 15 serves to position a third-phase winding 102 among the three-phase stator windings, for example. The spaces between the positioning parts 13, 14, and 15 are not identical. Specifically, the space between the positioning parts 14 and 15 is larger than the space between the positioning parts 13 and 14. Between the positioning parts 14 and 15, the thermistor-positioning part 16 is formed. The thermistor-positioning part 16 is similarly formed protruding from the upper planar surface of the terminal base 12. However, while the positioning parts 13, 14, 15 each protrude substantially perpendicularly from the upper planar surface, the positioning part 16 protrudes diagonally from the upper planar surface. As the thermistor 17 is positioned by the positioning part 16, the thermistor 17 extends diagonally with respect to the upper planar surface, as shown in the drawing. The element part of the thermistor 17 is exposed from the terminal base 12, and is located in the vicinity of the three-phase stator windings 100, 101, 102.

Figure 3:
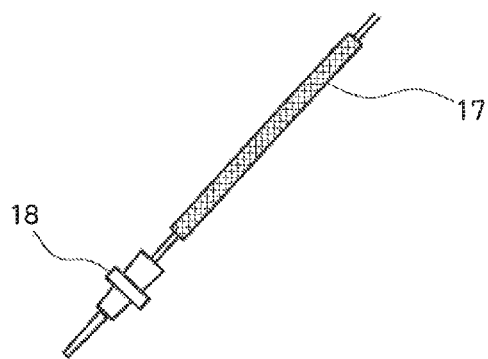
FIG. 3 is a diagram showing a configuration of a thermistor.

FIG. 3 is a diagram showing a configuration of the thermistor 17. A resin-molded positioning part 18 is formed at a tip portion of the thermistor 17, and this positioning part 18 is integrated with the terminal base 12 by insert molding. In the state in which the thermistor is insert molded on the terminal base 12, the positioning part 18 is the same as the positioning part 16. The positioning part 18 has a tapered shape with its diameter becoming smaller toward the tip. Further, the positioning part 18 has an annular stopper formed protruding from an intermediate portion thereof. By means of this stopper, the thermistor 17 can be prevented from being pushed out from the terminal base 12 due to the mold pressure applied when integrating the terminal base 12 with the stator by providing the resin molded member 11. More specifically, after the thermistor 17 is first insert molded on the terminal base 12, the terminal base 12, together with the thermistor, is molded on the stator using resin. During this resin molding process, the stopper can prevent the thermistor 17 from slipping out from the terminal base 12.

In the present embodiment, since the thermistor 17, the terminal base 12, and the stator are integrated into a single unit using resin, the thermistor 17 is closely adhered to the resin having high thermal conductivity, while positional deviation of the thermistor 17 is prevented and variances in the clearance of the thermistor 17 are avoided. It is therefore possible to highly accurately detect the temperature of the three-phase rotor windings or the temperature of the stator. By being able to detect the temperature of the three-phase stator windings or the temperature of the stator with high accuracy, it is possible to set a wider allowable operating temperature, range for the electric rotating machine compared to in a conventional configuration. That is, when the temperature detection accuracy is low, the electric rotating machine must be operated with sufficient margins in consideration of the low accuracy. In contrast, in the present embodiment, because the temperature can be detected with high accuracy, the margins can be set smaller, which results in widening the allowable operating temperature range for the electric rotating machine.

In the present embodiment, as the thermistor 17 is positioned between the positioning part 14 and the positioning part 15, the amount of resin used for the terminal base 12 can be reduced compared to, for example, a configuration in which the thermistor 17 is positioned at an end portion of the terminal base 12.

In the present embodiment, as the thermistor 17 is positioned between the positioning part 14 and the positioning part 15, the temperature of all of the three-phase stator windings 5 can be detected, in contrast to, for example, a configuration in which the thermistor 17 is positioned at an end portion of the terminal base 12.

Further, in the present embodiment, as the positioning part 16 for the thermistor 17 is formed diagonally with respect to the upper planar surface of the terminal base 12, it is possible to reduce the size of the terminal base along the axial length direction, i.e., the size of the terminal base in the x direction shown in FIG. 2.

While can embodiment of the present invention has been described above, the present invention is not limited to this embodiment, and various modifications may be made thereto.

For example, although the positioning parts 13, 14, 15, 16 are arranged in a straight line in the present embodiment, it is alternatively possible to configure such that the positioning parts 13, 14, 15 are arranged in a straight line while the positioning part 16 is not located along that straight line.

Further, although the thermistor 17 is located between the positioning part 14 and the positioning part 15 in the present embodiment, the thermistor 17 may alternatively be located between the positioning part 13 and the positioning part 14. In other words, it is sufficient so long as the thermistor 17 is located between two positioning parts located at two ends among the three positioning parts 13, 14, 15.

Figure 4:
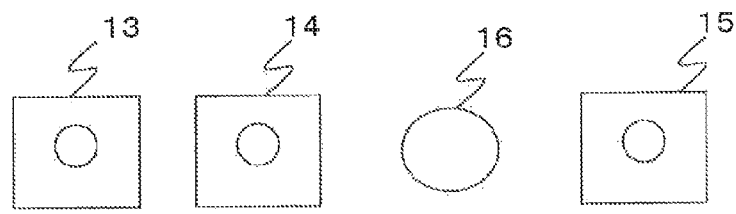
FIG. 4 is a diagram explaining an arrangement of positioning parts.
Figure 5:
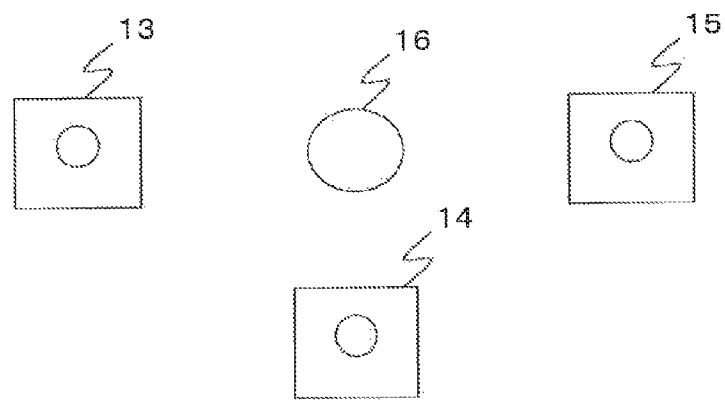
FIG. 5 is a diagram explaining an arrangement of positioning parts.
Figure 6:
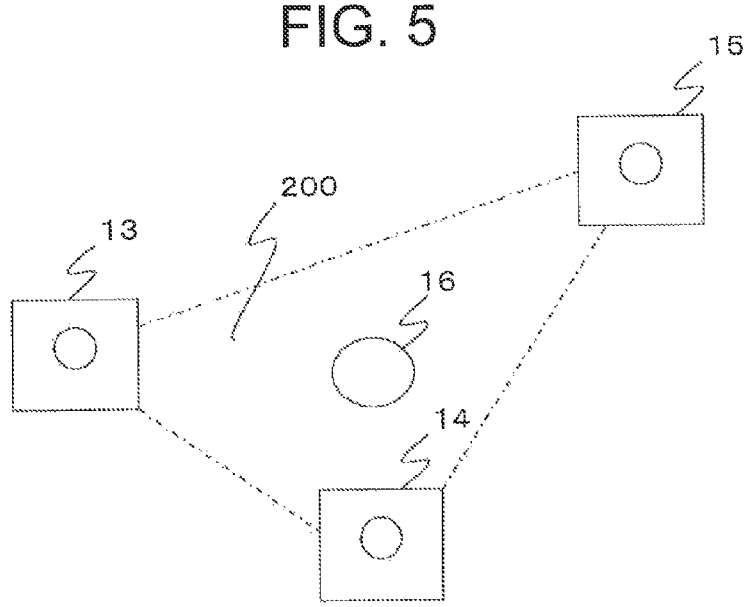
FIG. 6 is a diagram explaining an arrangement of positioning parts.
Figure 7:
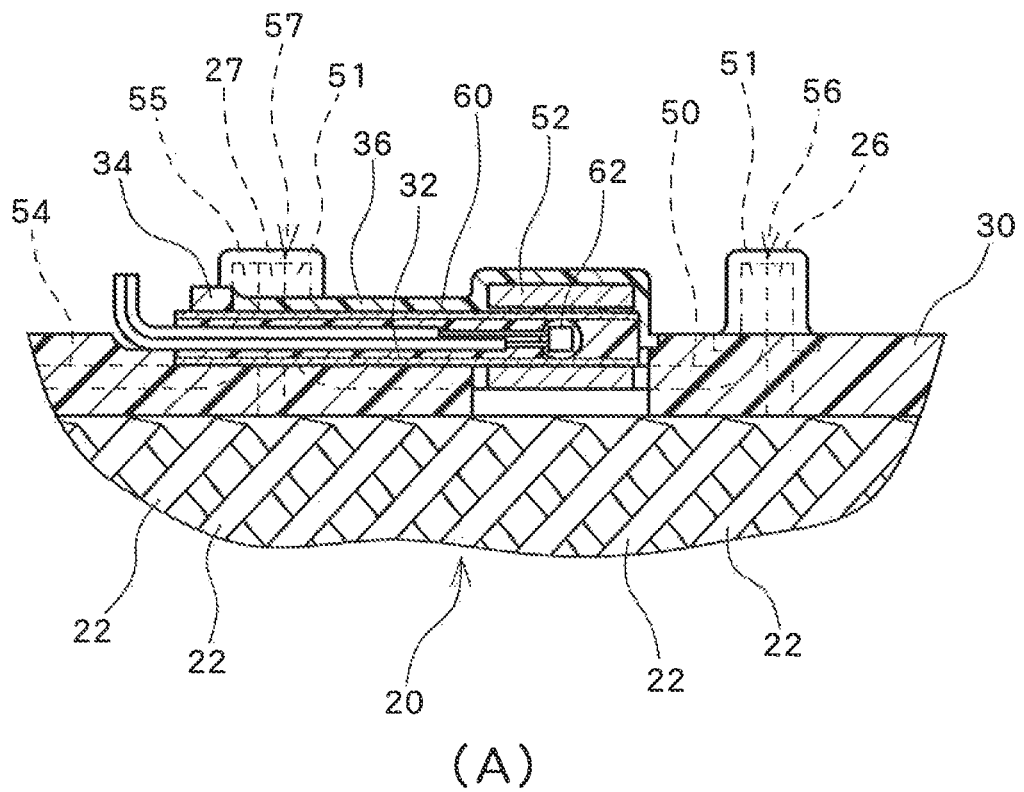
FIG. 7 is a diagram showing a configuration according to conventional art.
Figure 7:
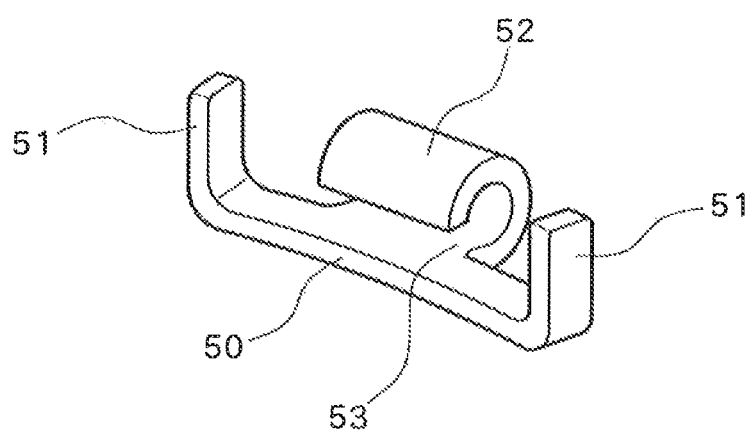

FIGS. 4-6 show example positional relationships among the positioning parts 13, 14, and 15 for the three-phase stator windings and the thermistor-positioning part 16. FIG. 4 illustrates the positional relationship shown in FIG. 1, in which the positioning parts 13, 14, 15 are arranged in a straight line, while the positioning part 16 is also located along that straight line and disposed between the positioning parts 14 and 15. FIG. 5 illustrates a case in which the positioning parts 13, 14, 15 are not arranged in a straight line, and shows that the positioning part 16 is disposed between the positioning parts 13 and 15 that are located at two ends. Similarly to FIG. 5, FIG. 6 illustrates a case in which the positioning parts 13, 14, 15 are not arranged in a straight line. In this case too, the positioning part 16 is disposed between the positioning parts 13 and 15 that are located at two ends, but more specifically, the positioning part 16 is disposed inside and on the boundary of a triangular area 200 having vertices at the positioning parts 13, 14, and 15. In the case of FIG. 6, the positioning part 16 may be positioned at a location that is equidistant from the positioning parts 13, 14, and 15, i.e., at the circumcenter of the triangle having vertices at the positioning parts 13, 14, and 15. According to this arrangement, when abnormal heat generation occurs in any specific winding among the three-phase stator windings, the temperature increase that occurs along with the abnormal heat generation can be defected with certainty.

Further, while the element part of the thermistor 17 is arranged by being exposed from the terminal base 12 in the present embodiment, the element part of the thermistor 17 may be disposed in contact with the neutral point or neutral point terminal of the three-phase stator windings. As the element part of the thermistor 17 of the present embodiment receives thermal influence mainly from the three-phase stator windings, the thermistor 17 can detect the temperature with high accuracy even when the element part is partly in contact with the neutral point or neutral point terminal. In other words, the present embodiment does not preclude having the element part of the thermistor 17 in contact with the neutral point or a neutral point terminal that is electrically connected thereto.

Furthermore, although a thermistor is used as the temperature detecting element in the present embodiment, the use of a thermistor is simply one example, and it is naturally possible to use an arbitrary element that changes in physical property depending on temperature.

Each of the positioning parts 13, 14, 15, 16 of the present embodiment may be specifically configured as a part having an opening or hole through which a stator winding or thermistor is inserted. Alternatively, each positioning part may be configured as a hook-shaped projection projecting from a surface of the terminal base 12, and a stator winding or the like may be positioned thereon.

LIST OF REFERENCE NUMERALS

1 electric rotating machine; 10 stator core; 11 resin molded member; 12 terminal base; 13, 14, 15 positioning part (for stator windings); 16 positioning part (for thermistor); 17 thermistor; 100, 101, 102 three-phase stator windings.

The invention claimed is:

1. An electric rotating machine, comprising:
a stator;
a terminal base on which a stator winding provided on the stator is positioned; and
a temperature detecting element that is positioned on the terminal base and that detects a temperature of the stator winding, wherein
the stator, the terminal base, and the temperature detecting element are integrally fixed to each other with resin;
the stator winding comprises three-phase stator windings;
the terminal base includes first, second, and third positioning parts at which the three-phase stator windings are positioned, respectively, and a fourth positioning part at which the temperature detecting element is positioned; and
the fourth positioning part is formed between two positioning parts located at two ends among the first, second, and third positioning parts.

2. The electric rotating machine according to claim 1, wherein
the first, second, third, and fourth positioning parts are formed in a straight line.

3. The electric rotating machine according to claim 1, wherein
the temperature detecting element is positioned diagonally with respect to an upper planar surface of the terminal base.

\* \* \* \* \*